United States Patent [19]
Meltser et al.

[11] Patent Number: 5,637,415
[45] Date of Patent: Jun. 10, 1997

[54] CONTROLLED CO PREFERENTIAL OXIDATION

[75] Inventors: Mark A. Meltser, Pittsford; Martin M. Hoch, Webster, both of N.Y.

[73] Assignee: General Motors Corporation, Detroit, Mich.

[21] Appl. No.: 706,315

[22] Filed: Aug. 30, 1996

[51] Int. Cl.$^6$ ................................................ H01M 8/06
[52] U.S. Cl. .................... 429/17; 429/19; 423/246
[58] Field of Search .................... 429/12, 13, 17, 429/19; 423/246, 247, 248; 422/168, 177

[56] References Cited

U.S. PATENT DOCUMENTS

| | | | |
|---|---|---|---|
| 4,650,727 | 3/1987 | Vanderborgh et al. | 429/19 |
| 4,910,099 | 3/1990 | Gottesfeld | 429/13 |
| 5,271,916 | 12/1993 | Vanderborgh et al. | 423/246 |
| 5,436,086 | 7/1995 | Seymour et al. | 429/17 |
| 5,498,487 | 3/1996 | Ruka et al. | 429/20 |

OTHER PUBLICATIONS

Birdsell et al., "Kinetic Analysis of Carbon Monoxide Oxidation During Methanol Stream Reforming Cleanup," AIAA 29th Intersociety Energy Conversion Engineering Conference 94–4077 Aug. 8–12, 1994/Monterey, CA.

*Primary Examiner*—Anthony Skapars
*Attorney, Agent, or Firm*—Lawrence B. Plant

[57] ABSTRACT

Method for controlling the supply of air to a PROX reactor for the preferential oxidation in the presence of hydrogen wherein the concentration of the hydrogen entering and exiting the PROX reactor is monitored, the difference therebetween correlated to the amount of air needed to minimize such difference, and based thereon the air supply to the PROX reactor adjusted to provide such amount and minimize such difference.

2 Claims, 2 Drawing Sheets

CONTROLLED CO PREFERENTIAL OXIDATION

The Government of the United States of America has rights in this invention pursuant to Agreement No. DE-AC02-90CH10435 awarded by the U.S. Department of Energy.

TECHNICAL FIELD

The present invention relates to a method for controlling the preferential oxidative reduction of the carbon monoxide content of a hydrogen-rich fuel stream for a fuel cell.

BACKGROUND OF THE INVENTION

Fuel cells have been proposed for many applications including electrical vehicular power plants to replace internal combustion engines. Hydrogen is often used as the fuel and is supplied to the fuel cell's anode. Oxygen (as air) is the cell's oxidant and is supplied to the cell's cathode.

The hydrogen used in the fuel cell can be derived from the reformation of methanol or other organics (e.g., hydrocarbons). Unfortunately, the reformate exiting the reformer contains undesirably high concentrations of carbon monoxide which can quickly poison the catalyst of the fuel cell's anode, and accordingly must be removed. For example, in the methanol reformation process, methanol and water (as steam) are ideally reacted to generate hydrogen and carbon dioxide according to the reaction:

$$CH_3OH + H_2O \rightarrow CO_2 + 3H_2$$

This reaction is accomplished heterogeneously within a chemical reactor that provides the necessary thermal energy throughout a catalyst mass and actually yields a reformate gas comprising hydrogen, carbon dioxide, carbon monoxide, and water. One such reformer is described in U.S. Pat. No. 4,650,727 to Vanderborgh. Carbon monoxide (i.e., about 1–3 mole %) is contained in the $H_2$-rich reformate/effluent exiting the reformer, and must be removed or reduced to very low nontoxic concentrations (i.e., less than about 20 ppm) to avoid poisoning of the anode.

It is known that the carbon monoxide, CO, level of the reformate/effluent exiting a methanol reformer can be reduced by utilizing a so-called "shift" reaction. In the shift reactor, water (i.e. steam) is added to the methanol reformate/effluent exiting the reformer, in the presence of a suitable catalyst, to lower its temperature, and increase the steam to carbon ratio therein. The higher steam to carbon ratio serves to lower the carbon monoxide content of the reformate according to the following ideal shift reaction:

$$CO + H_2O \rightarrow CO_2 + H_2$$

Some CO still survives the shift reaction. Depending upon the reformate flow rate and the steam injection rate, the carbon monoxide content of the gas exiting the shift reactor can be as low as 0.5 mole %. Any residual methanol is converted to carbon dioxide and hydrogen in the shift reactor. Hence, shift reactor effluent comprises hydrogen, carbon dioxide, water and some carbon monoxide.

The shift reaction is not enough to reduce the CO content of the reformate enough (i.e., to below about 20 ppm). Therefore, it is necessary to further remove carbon monoxide from the hydrogen-rich reformate stream exiting the shift reactor, and prior to supplying it the fuel cell. It is known to further reduce the CO content of $H_2$-rich reformate exiting the shift reactor by a so-called "PROX" (i.e., preferential oxidation) reaction effected in a suitable PROX reactor. The PROX reactor comprises a catalyst bed operated at temperatures which promote the preferential oxidation of the CO by air in the presence of the $H_2$, but without consuming/oxidizing substantial quantities of the $H_2$. The PROX reaction is as follows:

$$CO + \tfrac{1}{2}O_2 \rightarrow CO_2$$

Desirably, the $O_2$ required for the PROX reaction will be about two times the stoichiometric amount required to react the CO in the reformate. If the amount of $O_2$ exceeds about two times the stoichiometric amount needed, excessive consumption of $H_2$ results. On the other hand, if the amount of $O_2$ is substantially less than about two times the stoichiometric amount needed, insufficient CO oxidation will occur. The PROX process is described in a paper entitled "Methanol Fuel Processing for Low Temperature Fuel Cells" published in the Program and Abstracts of the 1988 Fuel Cell Seminar, October 23–26, 1988, Long Beach, Calif., and in U.S. Pat. Vanderborgh et al 5,271,916, inter alia.

PROX reactions may be either (1) adiabatic (i.e. where the temperature of the catalyst is allowed to rise during oxidation of the CO), or (2) isothermal (i.e. where the temperature of the catalyst is maintained substantially constant during oxidation of the CO). The adiabatic PROX process is typically effected via a number of sequential stages which progressively reduce the CO content in stages. Temperature control is important in adiabatic systems, because if the temperature rises too much, a reverse shift reaction can occur which actually produces more CO. The isothermal process can effect the same CO reduction as the adiabatic process, but in fewer stages (e.g., one or two stages) and without concern for the reverse shift reaction.

In either case (i.e., adiabatic or isothermal), a controlled amount of $O_2$ (i.e., as air), is mixed with the reformate exiting the shift reactor, and the mixture passed through a suitable catalyst bed known to those skilled in the art. To control the air input, the CO concentration in the gas exiting the shift reactor is measured, and based thereon, the $O_2$ concentration needed for the PROX reaction adjusted. However, effective real time CO sensors are not available, and accordingly system response to CO concentration measurements is slow. Alternatively for adiabatic systems, the catalyst temperature can be used as a reference to control the $O_2$ feed rate. Catalyst temperature cannot be used to control $O_2$ feed to an isothermal PROX reactor.

For the PROX process to be most efficient in a dynamic system (i.e., where the flow rate and CO content of the $H_2$-rich reformate vary continuously in response to variations in the power demands on the fuel cell system), the amount of $O_2$ (i.e., air) supplied to the PROX reactor must also vary on a real time basis, in order to continuously maintain the desired oxygen-to-carbon monoxide concentration ratio.

SUMMARY OF THE INVENTION

According to the present invention, there is provided a method for efficiently reducing the carbon monoxide content of an $H_2$-rich fuel gas for a $H_2$—$O_2$ fuel cell (i.e. without untoward consumption of $H_2$), and more particularly for controlling the $O_2$ feed rate to a PROX reactor. The method is particularly useful in conjunction with isothermal PROX systems where $O_2$ feed rate control cannot otherwise be based on catalyst temperature.

The invention involves the real-time control of the amount of $O_2$ (i.e., as air) supplied to a PROX reaction in response to the difference between the $H_2$ concentration in the fuel gas entering the PROX reactor and the $H_2$ gas stream exiting the PROX reactor so as to maximize CO consumption while minimizing $H_2$ consumption in the PROX reactor. More specifically, there is provided an improved method of operating a $H_2$—$O_2$ fuel cell system which utilizes a hydrogen-rich fuel gas containing a carbon monoxide content sufficient to poison the fuel cell's catalyst, by preferentially oxidizing the CO with a controlled amount of $O_2$ so as to produce a catalyst nontoxic feed stream for the fuel cell. The improved process comprises modulating of the flow rate of the $O_2$ input to the preferential oxidation reaction so as to minimize consumption of $H_2$ therein by: (1) measuring the $H_2$ content of the fuel cell fuel gas before it enters the PROX reaction; (2) measuring the $H_2$ content of the feed stream exiting the PROX reaction; (3) determining a first actual difference, $\Delta H_2^a$, between the $H_2$ contents of the PROX feed stream and the fuel cell fuel gas; (4) determining a second (i.e. control) difference, $\Delta H_2^c$, between the first actual difference, $\Delta H_2^a$, and a third reference difference, $\Delta H_2^r$, which corresponds to an ideal difference between the $H_2$ contents of the PROX feed stream and the fuel cell fuel gas; (5) from the second/control difference, $\Delta H_2^c$, determining the ideal flow rate for the $O_2$ to achieve the reference difference $\Delta H_2^r$; (6) determining a fourth difference, $\Delta O_2$, between the actual oxygen flow rate, $O_2^a$, to the preferential oxidation reaction and an ideal oxygen flow rate, $O_2^i$, to such reaction; (7) generating an output signal representative of the fourth difference; and (8) modulating the flow rate of the oxygen supplied to the PROX reactor in response to said output signal in order to achieve the ideal $O_2^i$ rate.

The invention will better be understood when considered in the light of the following detailed description of a specific embodiment thereof which is given hereafter in conjunction with the several drawings in which:

DESCRIPTION OF THE PREFERRED EMBODIMENT

Figure 1:
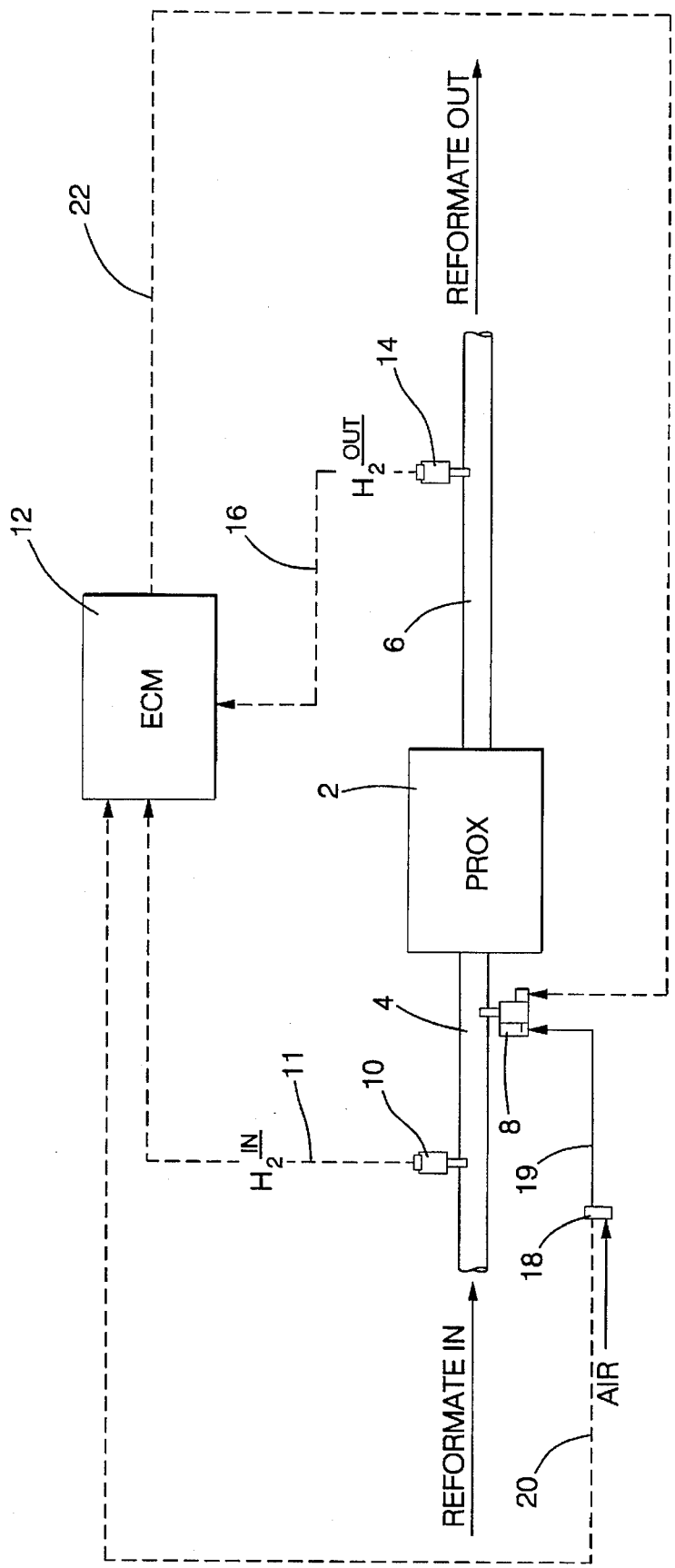
FIG. 1 schematically depicts the PROX $O_2$ control system of the present invention.

FIG. 1 depicts a single-stage PROX reactor 2 having an inlet conduit 4 for conveying CO-rich, $H_2$-rich reformate to the reactor 2 and an outlet conduit 6 for exhausting CO-lean, $H_2$-rich reformate from the reactor 2. For purposes of illustrating the present invention, the PROX reactor 2 is shown as simply a single-stage reactor. However, it is to be understood that the following description is equally applicable to each of several stages in a multi-stage reactor. The CO-contaminated $H_2$-rich reformate entering the PROX reactor 2 is mixed with oxygen (i.e., air) injected into the reformate upstream of the PROX reactor 4 via a controllable valve 8, and exits the PROX reactor 2 having a significantly lower carbon monoxide content. In a dynamic fuel cell system, the flow rate of the reformate varies with the load demands put upon the fuel cell system, and the concentration of the carbon monoxide in the reformate varies with the flow rate of the reformate, if for no other reason than the reaction residence time in the reformer and shift reactor varies. In order to optimize CO consumption in the PROX reaction while minimizing $H_2$ consumption, it is essential that the amount of oxygen mixed with the reformate vary on a real time basis as the carbon monoxide concentration of the reformate varies.

The control strategy of the present invention is based on the fact that if any carbon monoxide remains in the gas it will be oxidized preferentially to the hydrogen, and hence the hydrogen content of the gas will remain substantially the same in the inlet 4 and the outlet 6. However when all of the carbon monoxide is consumed, the oxygen will react with, and rapidly consume, hydrogen such that there will be a significant difference between the concentration of the hydrogen in the gas entering the PROX compared to the hydrogen concentration in the gas exiting the PROX.

In accordance with the present invention, the difference in hydrogen concentration between the inlet 4 and the outlet 6 of the PROX is used to control the amount of air that needs to be mixed with the reformate upstream of the PROX. To this end, a first hydrogen sensor 10 measures the concentration of the hydrogen in the inlet conduit 4 and sends a corresponding signal (i.e., voltage) 11 to the electronic control module 12 (ECM). Similarly, a second hydrogen sensor 14 associated with the outlet conduit 6 measures the concentration of the hydrogen in the reformate exiting the PROX 2, and sends a corresponding signal (i.e., voltage) 16 to the electronic control module 12. A suitable $H_2$ sensor for this purpose is described in U.S. patent application Ser. No. 08/543,541 filed Oct. 16, 1995, and assigned to the assignee of the present invention. At the same time, an air flow meter 18 in the air supply-stream 19 measures the flow of air to the controllable valve 8, and sends a signal 20 to the electronic control module 12. The signal 20 represents the actual flow rate of air into the inlet conduit 4 to the PROX reactor 2. As will be described in more detail in conjunction with FIG. 2, the electronic control module 12 processes the several input signals 11, 16, and 20, and outputs a control signal 22 for effecting the opening/closing of the controllable valve 8 to modulate the flow of air into the inlet conduit 4 of the PROX reactor 2 so as to provide the precise amount of air that is required to consume the carbon monoxide in the inlet gas to the PROX reactor 2 without consuming an untoward amount of hydrogen.

The ECM 12 implements the process and contains the necessary hardware and software for receiving inputs, converting inputs to other values correlated with the inputs, summing inputs, generating internal signals based on those inputs, and conditioning (i.e., integrating/differentiating) the internal signals to provide a smooth output control signal. More specifically, the ECM 12 takes the form of a conventional general purpose digital computer-based controller programmed to periodically carry out the process described hereafter at predetermined intervals (e.g., every 100 milliseconds). The controller includes such well known elements as (1) a central processing unit with appropriate arithmetic and logic circuitry for carrying out arithmetic, logic and control functions, (2) read-only memory (ROM), (3) read-write random access memory (RAM), (4) electronically programmable read only memory (EPROM), and (5) input and output circuitry which interfaces with the $H_2$ sensors, air flow meter and air control valve. The ROM contains the instructions read and executed by the CPU to implement the process described hereafter including summation and PID controller functions. The EPROM contains appropriate look-up tables and calibration constants (i.e., ideal $H_2$ concentration difference, $\Delta H_2^r$) for converting and comparing appropriate inputs/outputs.

The ECM 12 processes the several signals 11, 16 and 20 to provide an appropriate control signal 22 for controlling the valve 8 to modulate the air flow to the PROX reactor 2.

Figure 2:
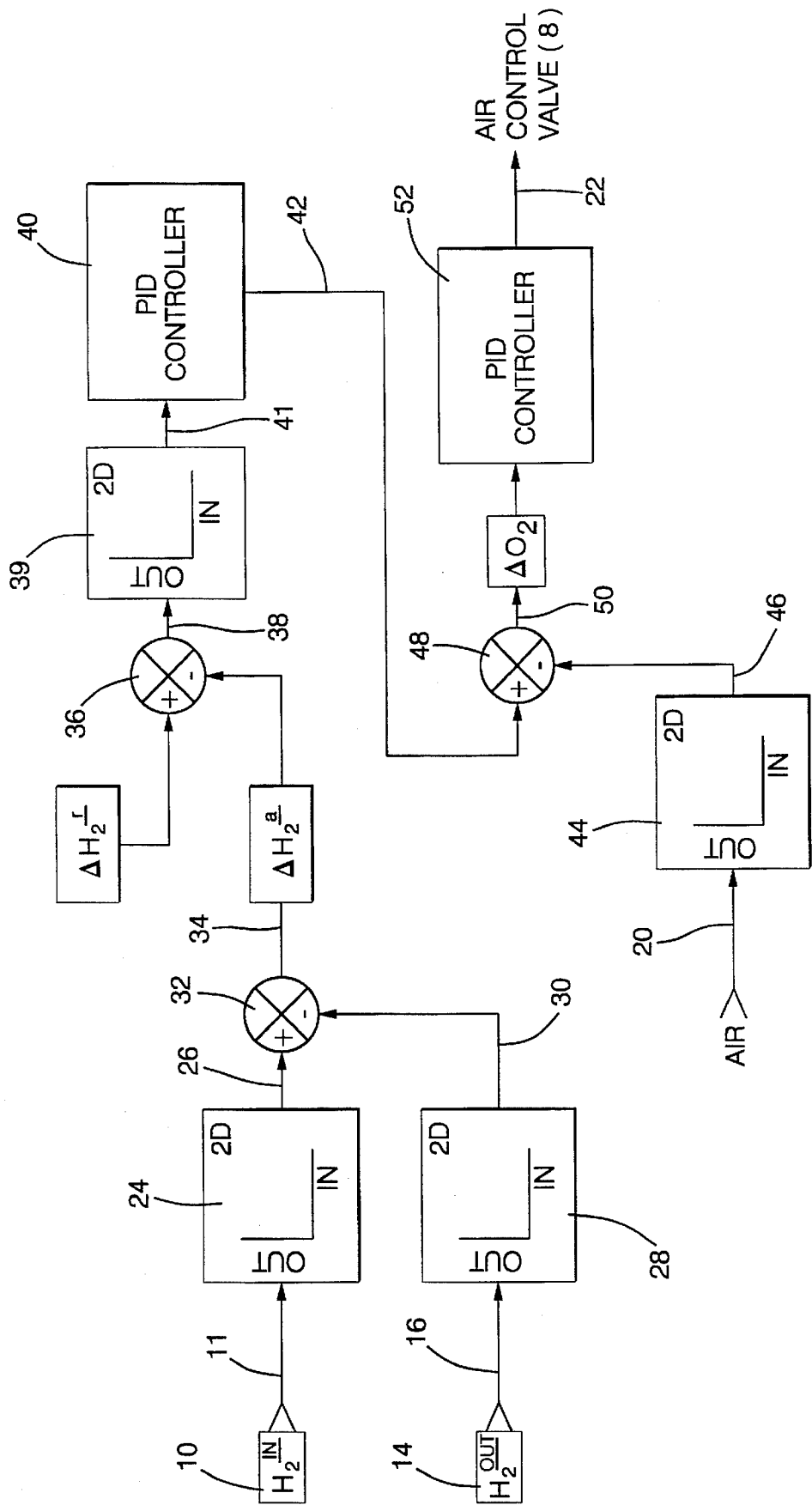
FIG. 2 is a control schematic of the process for controlling the system of FIG. 1.

As shown in the schematic of FIG. 2, the hydrogen sensor 10 provides a signal 11 to the ECM 12. The ECM 12 contains a conventional linear two-dimensional look-up table 24 stored in the electronically programmable read-only memory for converting the voltage input 11 from the sensor 10 to an output 26 indicative of the percentage hydrogen concentration in the reformate gas in inlet conduit 4. The values of the look-up table 24 are determined emperically to correlate the voltage input 11 to the proper hydrogen concentration. Similarly, the output signal 16 from the hydrogen sensor 14 is supplied to the ECM 12. The ECM 12 contains another linear, two-dimensional look-up table 28, similar to look-up table 24, for providing the same sort of sensor-voltage-to-percentage-hydrogen conversion as provided by look-up table 24, and for providing an output signal 30 corresponding to such hydrogen concentration. The output signals 26 and 30 are provided to a conventional error detector, or summing node 32, which is a series of instructions to the CPU to sum the inputs 26 and 30 and thereby determine the actual difference $\Delta H_2^a$ between the hydrogen concentration of the gas exiting the PROX reactor 2 and the hydrogen concentration of the gas entering the PROX reactor, and generates an output signal 34 representative of the actual difference $\Delta H_2^a$. The signal 34 is provided to a second summing node 36 which determines the difference $\Delta H_2^c$ between the actual $H_2$ concentration difference, $\Delta H_2^a$, and a reference $H_2$ concentration difference, $\Delta H_2^r$, which is a calibration constant for the ideal $H_2$ concentration difference for optimal CO consumption and minimal $H_2$ consumption which difference is the set point established by the system designer. $\Delta H_2^r$ is determined emperically to reflect the onset of significant hydrogen consumption in the PROX reactor 2 which indicates that most of the carbon monoxide has been consumed. The summing node 36, in turn, generates a signal 38 which indicates the difference $\Delta H_2^c$ between the reference hydrogen concentration difference ($\Delta H_2^r$), and the actual hydrogen concentration difference between the inlet and the outlet of the PROX 2 (i.e., $\Delta H_2^a$). The output signal 38 is inputted into a linear two-dimensional look-up table 39, the values of which are emperically determined, and convert the $H_2$ differential input signal 38 to an output signal 41 indicative of the ideal amount of oxygen, $O_2^i$, needed to cause the actual hydrogen difference $\Delta H_2^a$ to equal the reference hydrogen difference $\Delta H_2^r$. The output signal 41 is fed to a conventional proportional-plus-derivative-plus-integral controller (hereafter PID controller) 40, which is a sequence of arithmetic operations carried out by the CPU so as to temper or smooth out the signal 41 fed thereto and provide an improved signal 42 corresponding to the ideal air flow, $O_2^i$, needed to react with the CO in the reformate entering the PROX 2 through the inlet 4.

At the same time that the ideal amount of air needed for the PROX reaction is being determined, a signal 20 from the air flow meter 18 is fed to the electronic control module 12. The electronic control module 12 contains a linear two-dimensional look-up table 44 the values of which are emperically determined and convert the signal 20 from the flow meter 18 to an actual air flow rate $O_2^a$ output signal 46.

A summing node 48 determines any difference $\Delta O_2$ between the actual air flow rate, $O_2^a$, indicated by the signal 46, and the ideal air flow rate, $O_2^i$, indicated by the signal 42, and generates a signal 50 to a conventional PID controller 52, which may be the same PID controller 40 mentioned above or a separate controller like PID controller 40, which generates a temper output control signal 22 that effects the opening or closing of the valve 8 as needed to modulate the flow of air into the inlet 4 to the PROX 2 and to conform it to substantially the ideal $O_2$ flow rate $O_2^i$.

While the invention has been described solely in terms of one specific embodiment thereof it is not to be limited thereto but rather only to the extent set forth hereafter in the claims which follows.

We claim:

1. In a method of operating a $H_2$—$O_2$ fuel cell system comprising the principle steps of (1) providing a hydrogen-rich fuel gas having a first carbon monoxide, CO, content sufficient to poison the fuel cell's anode, and (2) subjecting said fuel gas to a preferential oxidation reaction for selectively oxidizing said CO with $O_2$ in the presence of said hydrogen to produce a feed stream for said fuel cell which has a second carbon monoxide content less than said first content, the improvement comprising controlling the flow rate of said $O_2$ to said preferential oxidation reaction so as to optimize the consumption of said carbon monoxide from said fuel gas while minimizing the consumption of $H_2$ therefrom by:

a. measuring the $H_2$ content of said fuel gas;
   b. measuring the $H_2$ content of said feed stream;
   c. determining a first actual difference, $\Delta H_2^a$, between the $H_2$ contents of said feed stream and said fuel gas;
   d. determining a second control difference, $\Delta H_2^c$, between said first actual difference, $\Delta H_2^a$, and a third reference difference, $\Delta H_2^r$, which reference difference corresponds to an ideal difference between the $H_2$ contents of said feed stream and said fuel gas;
   e. from said second control difference, $\Delta H_2^c$, determining the ideal oxygen flow rate, $O_2^i$, needed for said preferential oxidation reaction to achieve said reference difference $\Delta H_2^r$;
   f. determining a fourth difference, $\Delta H_2$, between the actual oxygen flow rate ($O_2^a$) to the preferential oxidation reaction and said ideal oxygen flow rate $O_2^i$ to such reaction;
   g. generating an output signal representative of the fourth difference $\Delta O_2$; and
   h. modulating the flow rate of the $O_2$ to said preferential oxidation reaction in response to said output signal to achieve said ideal oxygen flow rate $O_2^i$.

2. The process according to claim 1 wherein said preferential oxidation reaction is conducted substantially isothermally on a catalyst maintained at a substantially constant temperature.

* * * * *

UNITED STATES PATENT AND TRADEMARK OFFICE
CERTIFICATE OF CORRECTION

PATENT NO.   : 5,637,415
DATED        : June 10, 1997
INVENTOR(S)  : Mark A. Meltser and Martin M. Hoch It is certified that error appears in the above-identified patent and that said Letters Patent is hereby corrected as shown below:

Title page, in the Abstract line 2 after "oxidation" insert -- of carbon monoxide --.

In the Claims, at column 6, line 44 delete "$\Delta H_2$" and substitute therefor -- $\Delta O_2$ --.

Signed and Sealed this

Third Day of February, 1998

BRUCE LEHMAN

*Attest:*

*Attesting Officer*   Commissioner of Patents and Trademarks